(12) United States Patent
Easterday

(10) Patent No.: US 6,175,094 B1
(45) Date of Patent: Jan. 16, 2001

(54) STUD WELDING GUN

(75) Inventor: William C. Easterday, Elyria, OH (US)

(73) Assignee: Nelson Stud Welding, Inc., Elyria, OH (US)

( * ) Notice: Under 35 U.S.C. 154(b), the term of this patent shall be extended for 0 days.

(21) Appl. No.: 09/392,596

(22) Filed: Sep. 9, 1999

Related U.S. Application Data

(63) Continuation-in-part of application No. 09/371,880, filed on Aug. 9, 1999.

(51) Int. Cl.[7] .................................................. B23K 9/20
(52) U.S. Cl. ............................................................. 219/98
(58) Field of Search ........................ 219/98, 99; 221/266

(56) References Cited

U.S. PATENT DOCUMENTS

| | | |
|---|---|---|
| 2,402,256 | 6/1946 | Nelson . |
| 2,816,210 | 12/1957 | Mowry . |
| 3,303,318 * | 2/1967 | Spisak ..................................... 219/98 |
| 3,371,184 * | 2/1968 | Napoli ..................................... 219/98 |
| 3,679,860 | 7/1972 | Spisak . |
| 5,067,632 * | 11/1991 | Aubry .................................. 221/266 |
| 5,403,988 | 4/1995 | Kawada et al. . |
| 5,824,987 * | 10/1998 | Volk ....................................... 219/98 |
| 6,025,569 * | 2/2000 | McCardle et al. . |

* cited by examiner

Primary Examiner—Clifford C. Shaw
(74) Attorney, Agent, or Firm—Howard & Howard

(57) ABSTRACT

A stud welding gun (20) includes a barrel (42) which extends outward from a handle assembly (24). A chuck (46) on an outer end portion of the barrel (42) holds a stud (22) while the stud is being welded to a base member. A stud feed member (76) is manually moved along the barrel (42) from a retracted position to an extended position to sequentially feed studs (22) in a linear array (110) to the chuck (46). The stud feed member (76) has a leading end portion (124) which applied force against a trailing stud (22) in the array (110) of studs to move a leading stud (22) in the array of studs into the chuck (46). A detent (154) is engageable with a trailing stud (22) in the array (110) of studs to hold the array of studs against movement in a direction away from the chuck (46).

5 Claims, 5 Drawing Sheets

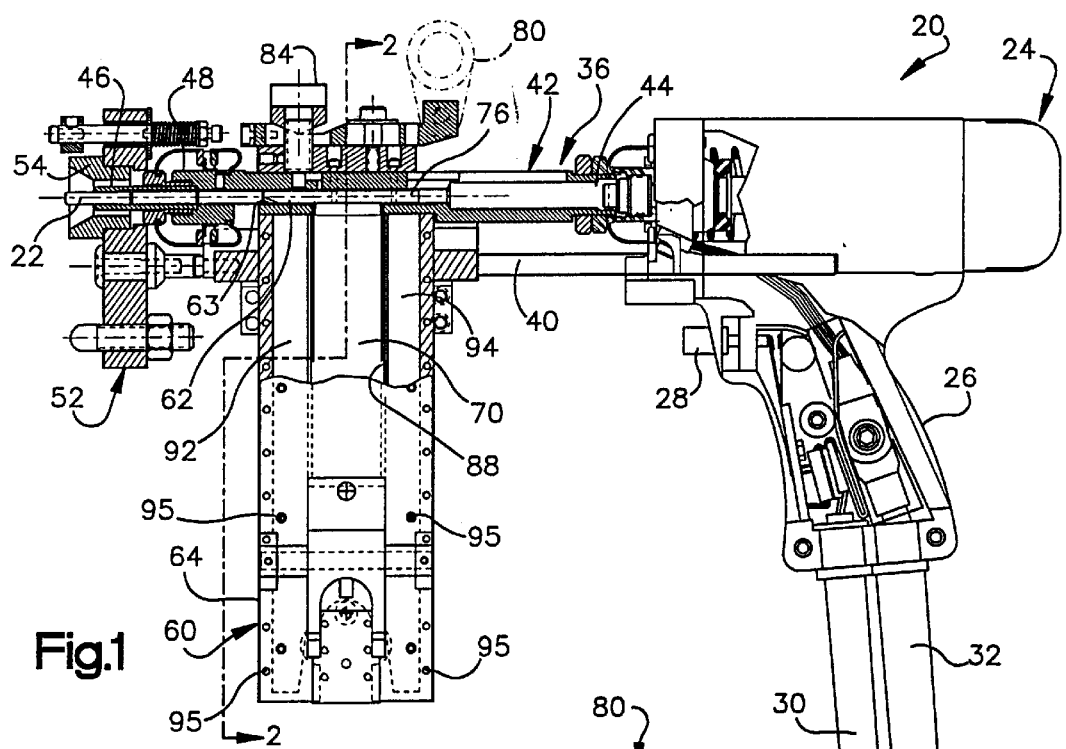
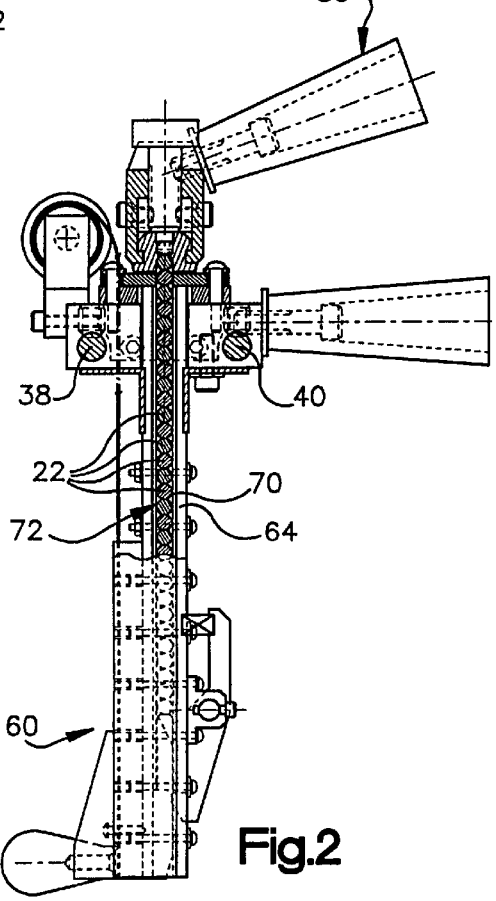

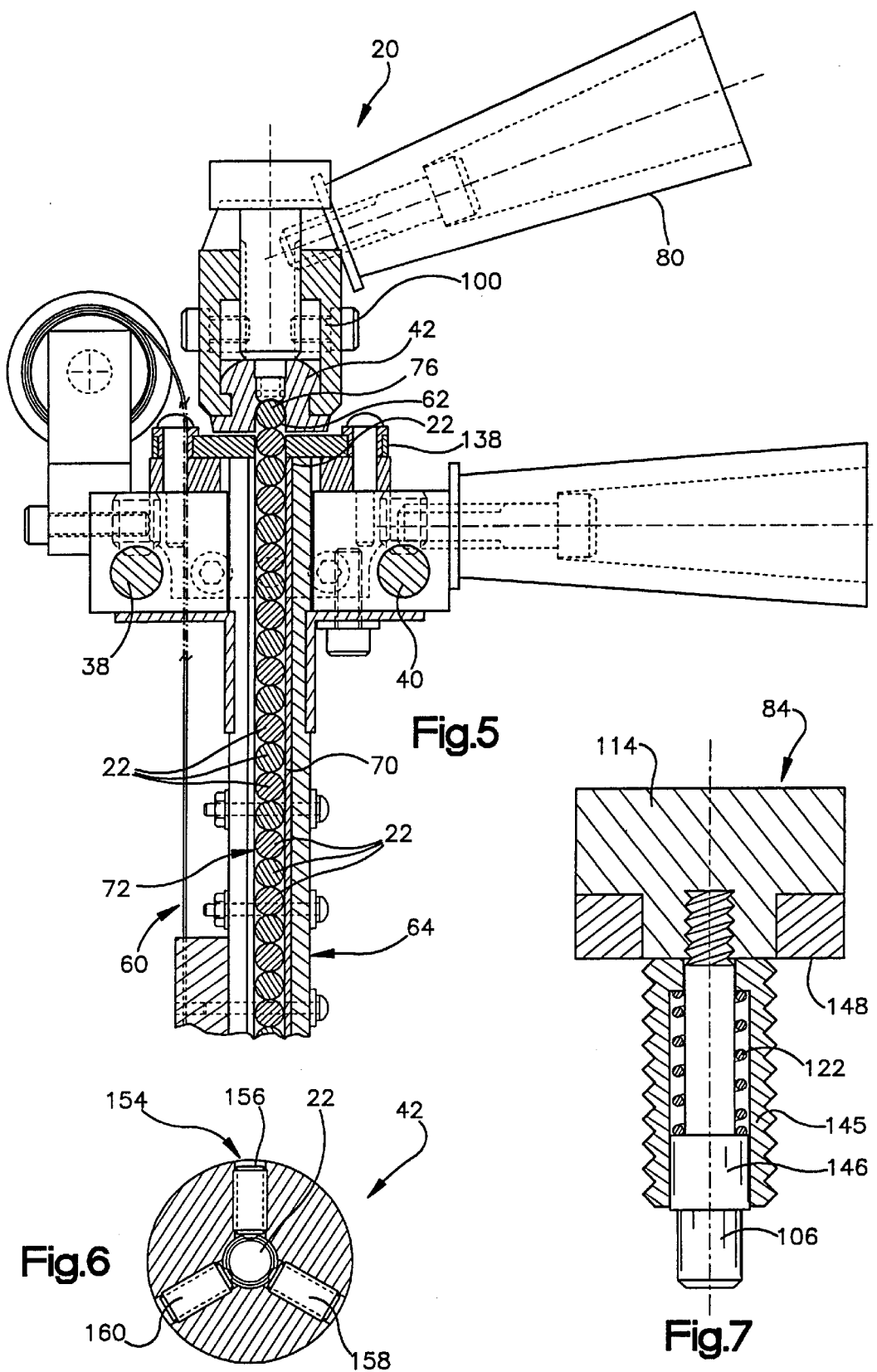

STUD WELDING GUN

RELATED APPLICATION

This application is a continuation-in-part of U.S. patent application Ser. No. 09/371,880 filed by William C. Easterday on Aug. 9, 1999 and entitled "Stud Welding Gun", pending. The disclosure in the aforementioned application Ser. No. 09/371,880 is hereby incorporated herein in its entirety by this reference thereto. The benefit of the earlier filing date of the aforementioned application Ser. No. 09/371,880 is hereby claimed.

BACKGROUND OF THE INVENTION

The present invention relates to a new and improved stud welding gun which is used to weld studs to a base member.

Stud welding guns have previously been utilized to weld studs to a base member. The studs are welded to the base member by establishing an electrical arc between the stud and base member. A known stud welding gun with a manually movable stud feed member or plunger is disclosed in U.S. Pat. No. 3,679,860.

During operation of the known stud welding gun, studs are fed one at a time to a location immediately ahead of the stud feed member. The stud feed member is then manually moved through a relatively long feed stroke to feed a stud to a chuck. The chuck holds the stud during welding of the stud to a base member. Other known stud welding guns are disclosed in U.S. Pat. Nos. 2,402,256 and 2,816,210.

SUMMARY OF THE INVENTION

An improved stud welding gun is used to weld studs to a base member. The stud welding gun includes a barrel having a passage in which a plurality of studs are disposed in an array. A stud holder is disposed at the outer end portion of the barrel and holds a stud during welding of the stud to a base member. A stud feed member movable relative to the barrel to move a leading stud in the array of studs into the stud holder. The stud feed member has a leading end portion which applies force against a trailing stud in the array of studs to move the array of studs along the passage in the barrel toward the stud holder.

BRIEF DESCRIPTION OF THE DRAWINGS

The foregoing and other features of the invention will become more apparent upon a consideration of the following description taken in connection with the accompanying drawings wherein:

FIG. 1 is a partially broken away side elevational view of a stud welding gun constructed in accordance with the present invention;

FIG. 2 is a sectional view, taken generally along the line 2—2 of FIG. 1, further illustrating the construction of the stud welding gun;

FIG. 5 is an enlarged fragmentary view of a portion of FIG. 2 and illustrating the relationship between the stud supply and a carriage which is connected with the stud feed member;

FIG. 6 is a sectional view, taken generally along the line 6—6 of FIG. 3, illustrating the relationship of a plurality of detent members to a stud which is disposed between the stud feed member and the chuck;

FIG. 7 is a simplified illustration of a latch which holds the stud feed member against movement during welding of a stud.

DESCRIPTION OF SPECIFIC PREFERRED EMBODIMENTS OF THE INVENTION

General Description

Figure 3:
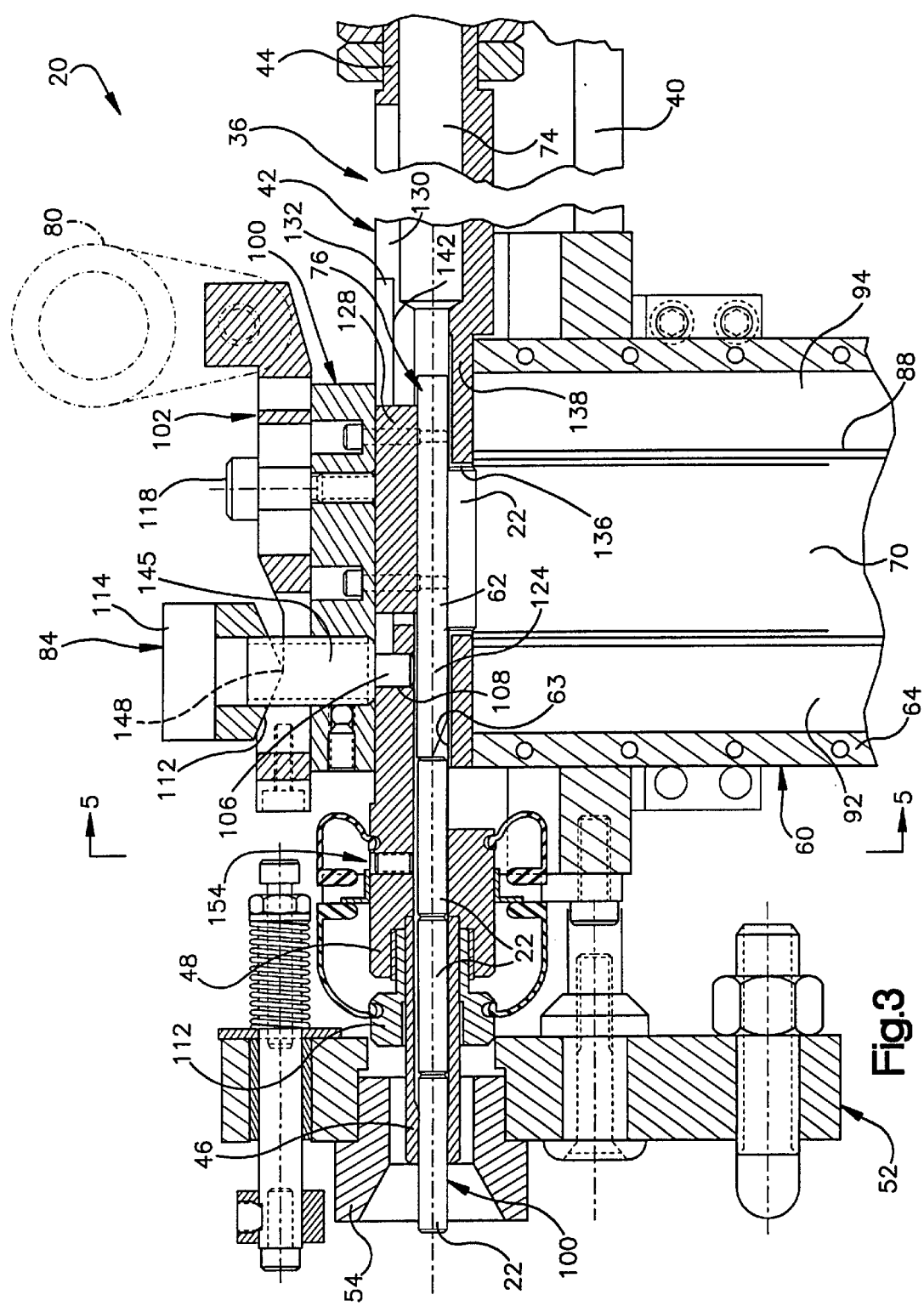
FIG. 3 is an enlarged fragmentary view of a portion of FIG. 1 and illustrating the relationship between a stud supply, a stud feed member, and a chuck which holds a stud during welding of the stud to a base member.

A stud welding gun 20 (FIG. 1) is utilized to sequentially weld studs 22 to a base member (not shown). The stud welding gun 20 includes a handle assembly 24 having a pistol grip 26 with a trigger switch 28. The trigger switch 28 is connected with a known controller by an electrical cable 30. Electrical current for establishing an arc between a stud 22 and a base member (not shown) is conducted to the pistol grip 26 through a second electrical cable 32. The general construction of the handle assembly 24 is the same as is disclosed in U.S. Pat. No. 3,809,849.

Stud welding gun attachments may be referred to as a frame 36 extending outward from the handle assembly 24. The frame 36 includes a pair of parallel solid cylindrical support rods 38 and 40 (FIG. 2). In addition, the frame 36 includes a tubular cylindrical barrel 42 (FIG. 1) having a longitudinal axis which extends parallel to the longitudinal axes of the support rods 38 and 40. A right (as viewed in FIG. 1) end portion 44 of the barrel 42 is fixedly connected with the handle assembly 24. A lifting mechanism, such as is disclosed in U.S. Pat. No. 3,809,849, is operable to move the barrel 42 along its longitudinal axis relative to the handle assembly 24.

A chuck 46 is connected with a left end portion 48 of the barrel 42. The chuck 46 holds each of the studs in turn during welding of the stud to a base member (not shown). A known foot assembly 52 is connected with the frame 36. The foot assembly 52 includes a spark shield 54 which extends around a stud 22 which is held by the chuck 46 during welding of the stud to the base member.

A stud supply 60 is operable to sequentially feed studs 22 along a linear supply path to a receiving location 62 in a cylindrical passage 63 in the barrel 42. The stud supply 60 includes an elongated rectangular housing 64 which is fixedly connected with the support rods 38 and 40 and extends downward (as viewed in FIG. 1) from the support rods.

The housing 64 holds a stud retainer or magazine 70 in which a plurality of studs 22 are disposed in a linear array 72 (FIGS. 2 and 5). The studs 22 are disposed in the linear array 72 with the studs in a side-by-side relationship. Longitudinal central axes of the studs 22 extend parallel to each other and parallel to a longitudinal central axis of the passage 63 in the tubular barrel 42 (FIG. 1) of the stud welding gun 20. By supplying studs 22 to the stud welding gun 20 in the stud retainer 70, loading the stud welding gun with studs is facilitated.

A stud feed member 76 (FIG. 1) is movable along the barrel 42 from a retracted position (FIG. 4) to the extended position illustrated in FIGS. 1 and 3 to move a stud 22 along the passage 63 from the receiving location 62 toward the chuck 46. When the cylindrical stud feed member 76 is moved axially toward the right (as viewed in FIG. 1) from the extended position (FIG. 3) to the retracted position (FIG. 4), the stud feed member moves out of the receiving location 62 to enable the stud supply 60 to feed a next succeeding stud 22 into the receiving location. The stud feed member 76 is then moved toward the left, to the extended position illustrated in FIGS. 1 and 3, to push a stud 22 from the receiving location 62 along the passage 63 toward the chuck 46.

Figure 4:
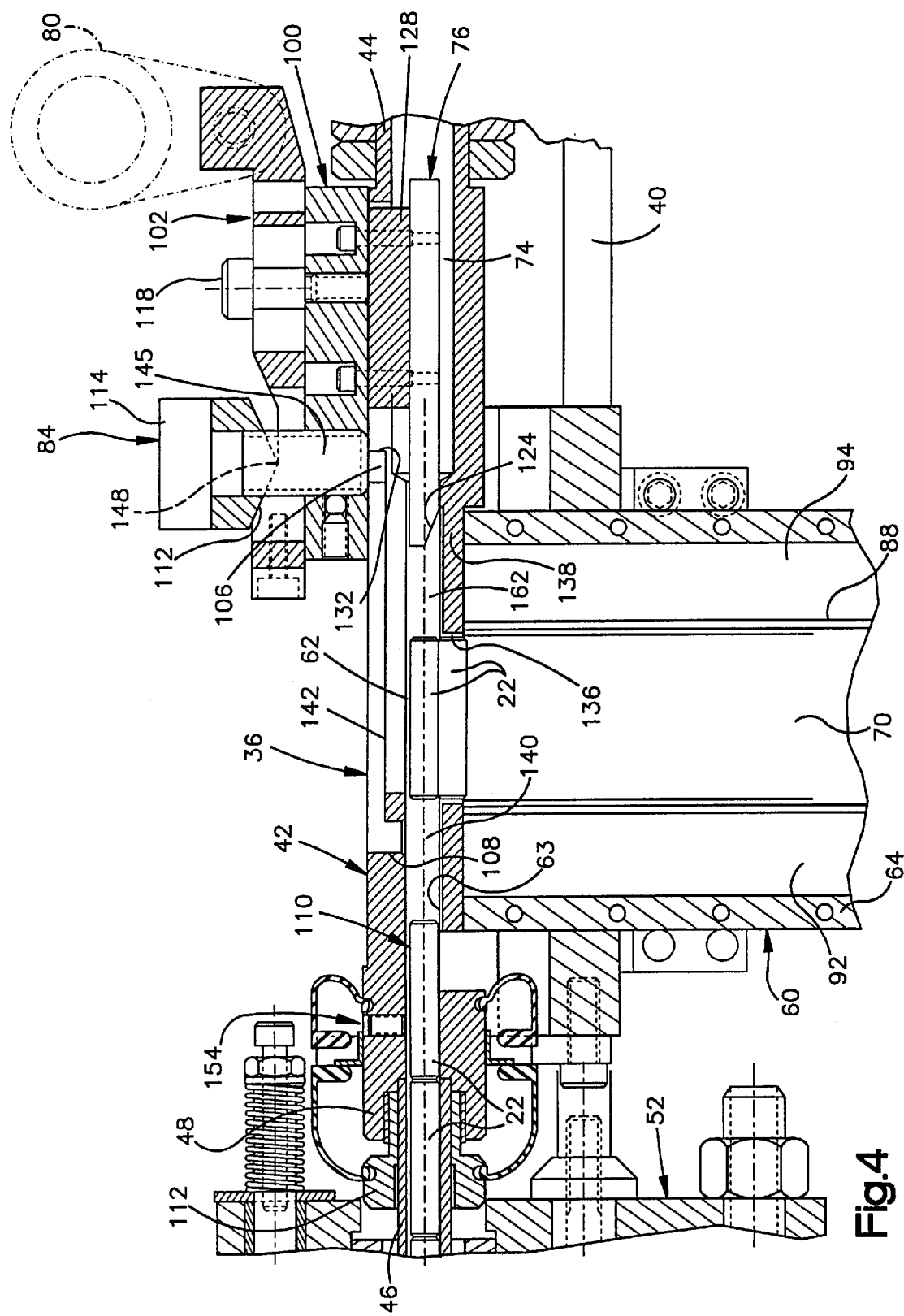
FIG. 4 is a fragmentary view, generally similar to FIG. 3, illustrating the stud feed member in a retracted position.

A manually engageable actuator member or handle 80 (FIGS. 1 and 2) is connected with the stud feed member 76. The actuator member 80 is manually gripped by an operator of the stud welding gun 20 and pulled toward the right (as viewed in FIG. 1) to move the stud feed member 76 from the extended position (FIG. 3) to the retracted position (FIG. 4). Similarly, the actuator member 80 is manually gripped by the operator and pushed toward the left (as viewed in FIG. 4) to move the stud feed member 76 from the retracted position back to the extended position. As the stud feed member 76 moves from the retracted position to the extended position, a stud 22 is pushed from the receiving location 62.

A latch 84 is provided to hold the stud feed member 76 in the extended position of FIGS. 1 and 3 during welding of a stud held by the chuck 46 to a base member. The latch 84 (FIGS. 1, 3 and 7) is operable to a disengaged condition prior to movement of the stud feed member 76 from the extended position to the retracted position. During movement of the stud feed member 76 from the retracted position (FIG. 4) to the extended position (FIG. 3), the latch 84 functions as a stop to block leftward (as viewed in FIG. 1) movement of the stud feed member 76 when it reaches the extended position.

The size of an opening or slot 88 (FIG. 1) in the stud supply housing 64 can be varied to accommodate studs of different lengths. As was previously mentioned, the studs 22 are held in a linear array 72 in a stud retainer 70 (FIGS. 2 and 5). The studs 22 illustrated in FIGS. 1 through 5 have a relatively short length. However, studs having a relatively long length may be welded with the stud welding gun 20. The long studs 22 are held in a stud retainer having a greater width, as measured in a direction perpendicular to a longitudinal central axis of a stud retainer, than does the stud retainer 70 of FIGS. 1, 3 and 5. However, the long studs are held in a stud retainer that has the same length as the stud retainer 70.

In order to enable the stud supply 60 to feed either the relatively short studs or the relatively long studs, the housing 64 is adjustable to change the size of the opening 88 (FIGS. 1 and 3). When the size of the opening 88 is to be adjusted, the housing 64 is disassembled and rectangular spacer strips 92 and 94 are removed from the housing. To remove the spacer strips 92 and 94, fasteners 95 (FIG. 1) are removed.

If the size of the opening or slot 88 is to be increased to accommodate the stud retainer containing relatively long studs, the spacer strips 92 and 94 are removed from the housing and narrower spacer strips substituted for the spacer strips 92 and 94. The narrow spacer strips are held in place by the fasteners 95. For even longer studs 22, the spacer strips 92 and 94 are omitted. The relatively narrow spacer strips or the omission of spacer strips result in the opening or slot 88 being wider so as to accommodate a wider stud retainer and longer studs.

The studs 22 have a generally cylindrical configuration which enables them to engage each other throughout their length and to be disposed in a side-by-side relationship in a linear array 72 (FIG. 5). If the studs 22 were provided with a relatively large head end portion and a shank portion which extends from the head end portion, the studs could not be arranged in engagement with each other throughout their length and disposed in a side-by-side relationship in a linear array.

The studs 22 are advantageously provided with opposite end portions which are mirror images of each other so that the studs can be fed to the chuck 46 with either end of the stud leading. The specific studs 22 illustrated in FIGS. 1 through 5 have opposite end portions with annular retaining rings. The retaining rings on one end portion of a stud 22 are reversely arranged in comparison with the retaining rings on the opposite end of the stud. This results in the studs having opposite end portions which are mirror images of each other. Although the studs 22 could have many different constructions, it is contemplated that it may be preferred to construct the studs in the same manner as is disclosed in U.S. patent application Ser. No. 09/271,661 filed Mar. 17, 1999 by Clark B. Champney and William C. Easterday and entitled "Stud Having Annular Rings".

Movement of Stud Along Barrel to Chuck

The stud feeder member 76 reciprocates along the barrel 42 to sequentially feed studs 22 from the receiving location 62 to the chuck 46. A carriage 100 (FIG. 3) is fixedly connected with the stud feed member 76. The actuator member 80 is fixedly connected to a slide member 102. The slide member 102 is mounted on the carriage 100 and is movable through limited distances toward either the left or right (as viewed in FIG. 7) relative to the carriage 100. The latch 84 is connected with the carriage 100 and moves with the carriage and stud feed member 76 relative to barrel 42.

The latch 84 has a cylindrical end portion 106 (FIGS. 3 and 7) which engages a cylindrical opening 108 (FIGS. 3 and 4) in the barrel 42. When the latch 84 is in the engaged condition shown in FIG. 3, the latch engages the opening 108 to hold the carriage 100 against movement relative to the barrel 42. By blocking movement of the carriage 100 relative to the barrel 42, the latch 84 prevents movement of the stud feed member 76 during welding of a stud 22 held by the chuck 46 to a base member.

During welding of a stud 22 held by the chuck 46, force is transmitted axially through a linear array 110 of studs 22 disposed in the barrel 42. The linear array 110 of studs 22 extends along the passage 63 from the chuck 46 through a chuck nut 112 to the stud feed member 76. At this time, the stud feed member 76 extends through the receiving location 62 to block the feeding of a stud from the stud supply housing 64 into the barrel 42. The stud feed member 76 also blocks rightward (as viewed in FIG. 3) movement of the array 110 of studs 22 along the passage 63.

Upon completion of welding of the leading stud 22 to the base member, the stud welding gun 20 is moved toward the right (as viewed in FIG. 3) to pull the stud welding gun off of the stud which is welded to the base member. Once the stud welding gun 20 has been disengaged from the stud which has been welded to the base member 22, the chuck 46 is empty and the array 110 of studs 22 in the barrel 42 contains one less stud 22.

During welding of a stud 22 to a base member, the linear array 110 of studs in the passage 63 in the barrel 42 contains three studs 22 (FIG. 3). After completion of welding of a leading stud 22 in the array 110 of studs and disengagement of the stud welding gun 20 from the welded stud, there are only two studs 22 in the array 110 of studs. It should be understood that the specific number of studs in the array 110 of studs at any given time in the stud welding process will vary as a function of the length of the studs 22.

In order to enable a stud 22 to be moved into the stud receiving location 62, the stud feed member 76 must be moved out of the receiving location. To accomplish this, an operator grips the actuator member 80 and pulls the actuator member toward the right (as viewed in FIG. 3). As the actuator member 80 is moved toward the right, the slide member 102 is also moved toward the right relative to the carriage 100.

Rightward movement of the slide member 102 relative to the carriage 100 causes a cam surface 112 on the slide member to force a head end portion 114 (FIGS. 3 and 7) of the latch 84 upward (as viewed in FIG. 3) away from the stud feed member 76. A screw 118 is fixedly connected with the carriage 100 and cooperates with a washer 120 to guide movement of the slide member 102 relative to the carriage. As the latch 84 is moved upward by the cam surface 112, a spring 122 (FIG. 7) is compressed and the end portion 106 of the latch 84 moves out of the opening 108 (FIG. 3) in the barrel 42.

When the end portion 106 of the latch 84 has moved out of the opening 108 in the barrel 42, the stud feed member 76 and carriage 100 are released for movement relative to the barrel. Therefore, the continued application of manual force to the actuator 80 is effective to pull the stud feed member 76, carriage 100 and slide member 102 together toward the right (as viewed in FIG. 3). As this occurs, an end portion 124 on the stud feed member 76 moves away from the studs 22 disposed in the passage 63 immediately ahead of the chuck 46.

Continued manual application of the rightward pulling force to the actuator member 80 by the operator of the stud welding gun 20 moves a plate 128 (FIGS. 3 and 4) connected with the bottom of the carriage 100 along a linear rectangular slot 130 formed in the barrel 42. When the stud feed member 76 has moved to the retracted position (FIG. 4), the end portion 106 of latch 84 abuts a stop surface 132 formed in the guide slot 130 in the barrel 42 to block further rightward (as viewed in FIG. 4) movement of the carriage 100 and stud feed member 76.

When the stud feed member 76 has moved to the retracted position (FIG. 4), a stud 22 disposed at the upper end of the linear array 72 in an opening 136 in a rectangular aperture or feed plate 138 is released for upward movement into the receiving location 62 in the barrel 42. When the stud 22 is in the receiving location 62 in the barrel 42, a longitudinal central axis of the stud 22 is aligned with a longitudinal central axis of the stud feed member 76.

The stud 22 at the receiving location 62 in the barrel 42 is spaced from the preceding studs in the passage 63 in the barrel by a space or gap 140 (FIG. 4). Although the stud 22 at the receiving location 62 is spaced from the preceding studs in the passage 63 in the barrel 42, the stud 22 at the receiving location 62 is in axial alignment with the preceding studs. Therefore, the stud 22 at the receiving location 22 forms part of the array 110 of studs.

After the stud feed member 76 has been moved to the retracted position, the operator reverses the force applied against the actuator member 80. Thus, rather pulling on the actuator member 80, the operator manually pushes against the actuator member 80. This pushing movement urges the actuator member toward the left (as viewed in FIG. 4).

Initial leftward movement of the actuator member 80 results in leftward movement of the slide member 102 relative to the carriage 100. The end portion 106 on the latch 84 slides along a shoulder 142 (FIGS. 3 and 4) of the slot 130 to maintain the latch 84 in the disengaged condition. The shoulder 142 on the slot 130 holds the latch 84 in the disengaged position during leftward (as viewed in FIG. 4) movement of the slide member 102, carriage 100 and stud feed member 76.

As the stud feed member 76 moves leftward from the retracted position of FIG. 4, the end portion 124 of the stud feed member 76 moves into engagement with an end of a stud 22 disposed at the receiving location 62. Continued movement of the actuator member 80 and stud feed member 76 pushes the stud 22 from the receiving location into engagement with a preceding stud disposed in the passage 63 in the barrel 42 ahead of the chuck 46. Continued leftward movement of the stud feed member 76 moves the next stud 22 to be welded into the chuck 46 and moves the stud engaged by the end portion 124 of the stud feed member 76 out of the receiving location and into the position occupied by the trailing stud in the array 110 in FIG. 3.

As this occurs, the end portion 106 of the latch 84 moves into abutting engagement with a portion of the opening 108 in the barrel 42. This results in leftward (as viewed in FIG. 3) movement of the stud feed member 76 being interrupted with the stud feed member in the extended position illustrated in FIG. 3.

The operator then interrupts the application of manual force to the actuator member 80. At this time, the end portion 106 of the latch 84 is no longer held in the disengaged condition by the shoulder 142 on the slot 130. Force transmitted from the compressed spring 122 (FIG. 7) is transmitted from the latch body 145 to a cylindrical section 146 which is fixedly connected with the end portion 106. This force moves the end portion 106 downward into the opening 108 (FIGS. 3 and 4) in the barrel 42 under the influence of the biasing spring 122 (FIG. 7).

When the stud feed member 76 has moved back to the extended position illustrated in FIG. 3, the leading stud 22 in the axially aligned array 110 of studs in the passage 63 in the barrel 42 is gripped by the chuck 46 and is in position for welding to a base member. The stud 22 gripped by the chuck 46 is blocked against rightward movement (as viewed in FIG. 3) by the studs disposed in the barrel 42 between the feed member 76 and the chuck.

It is contemplated that the stud welding gun 20 may be utilized to weld studs 22 to base members which are disposed above an operator, for example, to a ceiling or to an overhead beam. When stud welding gun 20 is used to effect an overhead stud welding operation, the barrel 42 of the stud welding gun may be pointed upward when the operator pulls the actuator member 80 to move the stud feed member 76 from the extended position illustrated in FIG. 7 toward the retracted position.

In accordance with one of the features of the present invention, a detent assembly 154 (FIGS. 3, 4 and 6) in the barrel 42 prevents downward movement of a stud 22 immediately ahead of the receiving location 62 under the influence of gravity, when the stud welding gun 20 is pointed upward. The detent assembly 154 also prevents movement of the stud 22 immediately ahead of the receiving location 62 when the stud feed member 76 is moved from the extended position (FIG. 3) to the retracted position (FIG. 4).

The detent assembly 154 includes a plurality of spring biased plungers 156, 158, and 160 (FIG. 6). The spring biased plungers 156, 156 and 160 grip the stud 22 disposed immediately ahead of the receiving location 62 to hold the stud against downward movement under the influence of gravity. Although the detent assembly 154 grips the stud 22 disposed in the passage 63 immediately ahead of the receiving location 62 in the barrel 42, the detent assembly does not provide sufficient force to prevent studs from being fed through the detent assembly during movement of the stud feed member 76 from the retracted position to the extended position.

In accordance with another feature of the present invention, the stud feed member 76 is moved through a relatively short stroke when the stud feed member moves between the extended position of FIG. 3 and the retracted position of FIG. 4. The short stroke of the stud feed member 76 is due to the array of studs 22 disposed in the barrel 42 ahead of the receiving location 62.

When the stud feed member 76 is moved from the retracted position of FIG. 4 back to the extended position of FIG. 3, the stud 22 which is moved from the stud supply 60 into the receiving location 62 is moved toward the left (as viewed in FIG. 4). Movement of the stud 22 from the receiving location 62, moves a leading end of the stud into engagement with a trailing end of the next preceding stud 22. Continued movement of the stud feed member 76 from the retracted position of FIG. 4 toward the extended position of FIG. 3 results in the application of force by the leading end portion 124 of the stud feed member 76 to the array 110 of studs 22. This force pushes a leading stud in the array 22 of studs along the passage 63 toward the chuck 46. The array 110 of studs is advanced by the stud feed member to the position shown in FIG. 3. This results in the leading stud 22 in the array 110 of studs being positioned in the chuck 46 for welding to a base member (not shown).

By transmitting force through the array 110 of studs 22 to sequentially move studs into the chuck 46, the length of the operating stroke of the stud feed member 76 is minimized. The wasted movement of the stud feed member 76 during the feeding of studs to the chuck 46 corresponds to the size of the gap 140 (FIG. 4) ahead of a stud 22 at the receiving location 62 and the size of a gap 162 between a leading end portion 124 of the stud feed member 76 and the stud 22 at the receiving location 62. If studs 22 were longer, the gaps 140 and 162 would be reduced in size and would almost be completely eliminated for relatively long studs. This results in the stud feed member 76 moving through a feed stroke of a length which exceeds the length of a stud 22 by a relatively short distance. Therefore, the weight of the stud welding gun 20 is minimized.

Second Emodiment

In the embodiment of the invention illustrated in FIGS. 1–7, the stud welding gun 20 is manually actuated to feed studs 22 supplied from a magazine 70. In the embodiment of the invention illustrated in FIG. 8, a stud feed member is moved by a power actuator to feed studs supplied through a flexible tube to the stud welding gun. Since the embodiment of the invention illustrated in FIG. 8 is generally similar to the embodiment of the invention illustrated in FIGS. 1–7, similar numerals will be utilized to designate similar components, the suffix letter "a" being associated with the components of FIG. 8 in order to avoid confusion.

The stud welding gun 20a includes a barrel 42a. A stud feed member 76a is reciprocatable in the barrel 42a to sequentially feed studs 22a from a receiving location 62a along a cylindrical passage 63a to a stud holder or chuck 46a. An electrical current establishes an arc between a stud 22a held by the stud holder or chuck 46a and a base member (not shown) to which the stud is to be welded.

The cylindrical studs 22a are sequentially conducted to the barrel 42a through a flexible tube or conduit 180. Studs 22a are conducted through the flexible tube 180 with a longitudinal central axes of the studs extending along a longitudinal central axis of the flexible tube. Studs 22a are supplied to the flexible tube 180 from any suitable source, such as a vibratory feeder. Studs 22a are transferred one at a time from the feeder to the flexible tube 180. Air pressure is conducted through the flexible tube 180 to sequentially blow the studs 22a away from the vibratory feeder to the receiving location 62a. As a stud 22a moves from the flexible tube 180 to the receiving location 62a, the stud rotates to an orientation in which its longitudinal central axis becomes aligned with a longitudinal central axis of the passage 63a in the barrel 42a.

Figure 8:
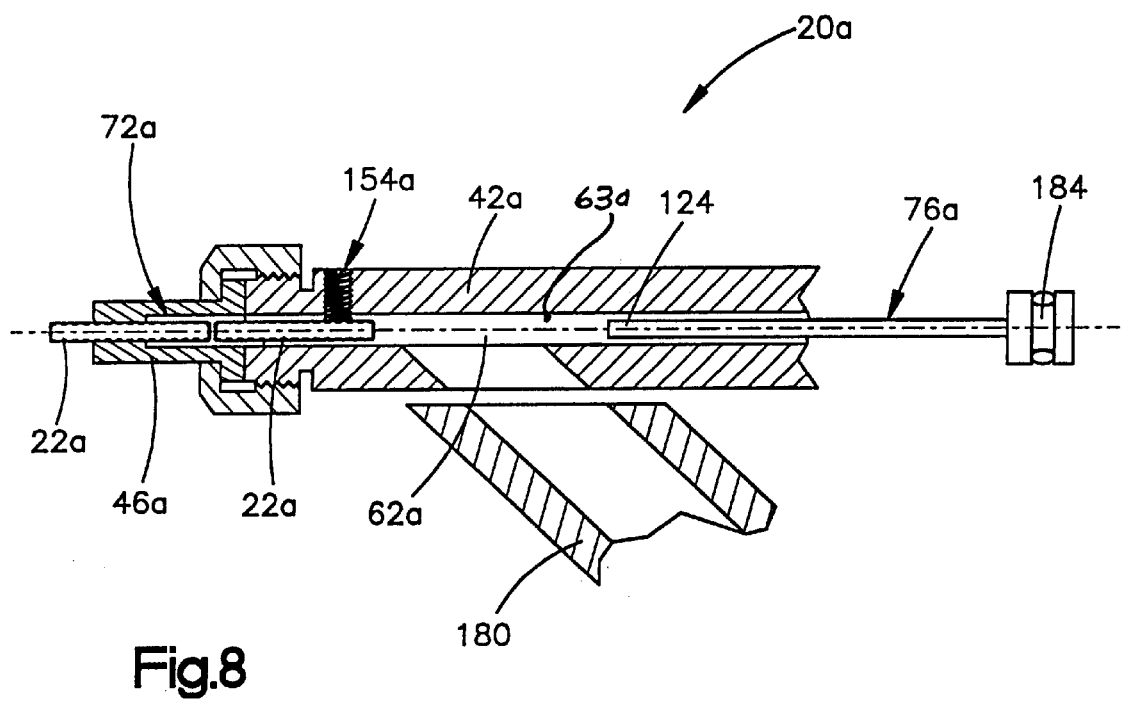
FIG. 8 is a fragmentary schematic illustration of a second embodiment of a stud welding gun constructed in accordance with the present invention.

The stud feed member 76a is then moved from the retracted position illustrated in FIG. 8 to an extended position to push the stud 22a from the receiving location 62a along the passage 63a toward the chuck 46a. As the stud feed member 76a moves from the retracted position to the extended position, a leading end portion 124a of the stud feed member engages a trailing end portion of the stud 22a at the receiving location 62a to push the stud toward the stud holder or chuck 46a. The stud feed member 76a is connected with a piston 184 which is moved in a known manner under the influence of air pressure. The manner in which studs are moved along the flexible tube 180 to the receiving location 62a is the same as is disclosed in U.S. Pat. No. 4,019,013. Of course, other known stud feed arrangements could be utilized if desired.

In accordance with one of the features of the present invention, the stud feed member 76a is moved through a relatively short stroke when the stud feed member moves between the retracted position of FIG. 8 and an extended position to move a stud 22a toward the chuck 46a. The short stroke of the stud feed member 76a is due to an array 110a of studs 22a disposed in the passage 63a in the barrel 42a. The array 110a of studs extends along the passage 63a from a location immediately forward of the receiving location 62a to the chuck 46a.

In the embodiment of the invention illustrated in FIG. 8, there are two studs 22a in the array 110a of studs. However, a greater number of studs could be provided in the array 110a of studs if desired. The number of studs in the array 110a of studs will vary as a function of variations in the length of the studs 22a. Thus, the shorter the length of the studs 22a, the greater the number of studs which will be provided in the array 110a of studs.

When the stud feed member 76a is moved from the retracted position toward the extended position under the influence of fluid pressure applied against the piston 184, the leading end portion 124a of the stud feed member 76a applies force against the trailing end portion of a stud 22a at the receiving location 62a. This force pushes the stud 22a from the receiving location 62a along the passage 63a toward the chuck 46a. The stud 22a at the receiving location 62a is the last trailing stud in the array 110 of studs. As this occurs, a stud 22a immediately ahead of the next stud to be moved into the chuck 46a applies force against the trailing end of the next stud to be moved to the chuck. This force moves a leading stud in the array 110a of studs into the chuck 46a.

During welding of a stud held by the chuck or stud holder 46a, the stud feed member 76a is maintained in the extended position. The extended stud feed member 76a blocks rearward movement, that is, movement toward the right as viewed in FIG. 8, of the array 110a of studs.

Once the leading stud 22a in the array 110a of studs has been welded to a base member, the stud welding gun 20a is disengaged from the leading stud in the array of studs. The stud feed member 76a is then retracted and a next succeeding stud 22a is moved to a receiving location 62a. As a stud moves from the flexible tube 180 into the receiving location 62a, the stud becomes the trailing stud in the array 72a of studs. The stud feed member 76a is then moved leftward (as viewed in FIG. 8) from the retracted position to the extended position to move the array 110a of studs 22a along the passage 63a toward the chuck 46a. As this occurs, the leading stud 22*a* in the array 110*a* of studs is moved into the chuck 46*a* to the position illustrated in FIG. 8.

By transmitting force from the stud feed member 76*a* through one or more studs 22*a* to a leading stud in the array 110*a* of studs, the stroke of the feed member between the retracted and extended positions is minimized. Minimizing the stroke of the stud feed member 76*a* tends to minimize the weight of the stud welding gun 20*a* and the time required to feed each stud in turn from the receiving location 62*a* along the passage 63*a* to the chuck 46*a*.

In accordance with one of the features of the present invention, a detent assembly 154*a* prevents rightward (as viewed in FIG. 8) movement of the array 110*a* of studs 22*a*. This results in the array 110*a* of studs 22*a* being held against movement back toward the receiving location 62*a* when the chuck 46*a* is disengaged from a stud welded to a base member and when the stud feed member 76*a* is moved from the extended position to the retracted position. The detent assembly 154*a* has the same construction as the detent assembly 154 of FIG. 6.

Although the detent assembly 154*a* grips a trailing stud 22*a* in the array 72*a* of studs during movement of the stud feed member 76*a* from the extended position back toward the retracted position, the detent assembly does not apply sufficient force to an engaged stud to prevent studs from being fed through the detent assembly during movement of the stud feed member 76*a* from the retracted position to the extended position. Although only a single detent assembly 154*a* is utilized in the embodiment of the invention illustrated in FIG. 8, it should be understood that a plurality of detent assemblies having the same construction as the detent assembly 154*a* could be provided at spaced apart locations along the barrel 42*a* if desired.

By transmitting force from the stud feed member 76 (FIGS. 3 and 4) or 76*a* (FIG. 8) through one or more studs 22 or 22*a*, the stroke of the stud feed member is reduced. Shortening the stroke of the stud feed member 76 or 76*a* reduces the weight and overall length of the stud welding gun 20 or 20*a*. Reducing the overall length of the stud welding gun 20 or 20*a* moves the center of gravity of components extending outward from the handle assembly of the stud welding gun closer to the handle assembly. They result is a stud welding gun 20 or 20*a* which minimizes operator fatigue.

From the above description of the invention, those skilled in the art will perceive improvements, changes and modifications. Such improvements, changes and modifications within the skill of the art are intended to be covered by the appended claims.

Having described the invention, the following is claimed:

1. A stud welding gun for use in welding studs to a base member, said stud welding gun comprising:

a barrel having a passage in which a plurality of studs are disposed in an array;

a stud holder disposed at an outer end portion of said barrel, said stud holder being effective to hold a stud while an electrical current flows between the stud held by said stud holder and the base member during welding of the stud held by said stud holder to the base member; and a stud feed member which is movable relative to said barrel to move a leading stud in the array of studs into said stud holder, said stud feed member having a leading end portion which applies force against a trailing stud in the array of studs to move the array of studs along the passage in said barrel toward said stud holder.

2. A stud welding gun as set forth in claim 1 further including a detent connected with said barrel and engagable with the trailing stud in the array of studs in said barrel to hold the array of studs against movement along the passage in said barrel in a direction away from said stud holder.

3. A stud welding gun as set forth in claim 1 wherein said stud feed member is movable relative to said barrel from an extended position to a retracted position, said leading end portion of said stud feed member being spaced from the array of studs when said stud feed member is in the retracted position to enable a stud to be added to the array of studs in the passage in said barrel, said stud feed member being movable from the retracted position to the extended position to apply force against a trailing end of the stud added to the array of studs to move the array of studs along the passage in said barrel toward said stud holder.

4. A stud welding gun as set forth in claim 3 further including a detent which is engagable with the array of studs to retain the array of studs against movement along the passage in said barrel in a direction away from said stud holder upon movement of said stud feed member from the extended position to the retracted position.

5. A stud welding gun as set forth in claim 3 further including a manually engageable actuator member connected with said stud feed member to move said stud feed member between the extended and retracted positions under the influence of force manually applied to said actuator member.

\* \* \* \* \*